US007142159B1

(12) United States Patent
Farley

(10) Patent No.: US 7,142,159 B1
(45) Date of Patent: Nov. 28, 2006

(54) PSEUDOLITE NAVIGATION SYSTEM

(75) Inventor: Michael G. Farley, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 235 days.

(21) Appl. No.: 11/013,064

(22) Filed: Dec. 11, 2004

(51) Int. Cl.
  G01S 1/08 (2006.01)
  G01S 5/14 (2006.01)
  H04B 7/185 (2006.01)

(52) U.S. Cl. ............ 342/386; 342/357.02; 342/357.06; 455/13.2

(58) Field of Classification Search ..................... None
  See application file for complete search history.

(56) References Cited

U.S. PATENT DOCUMENTS

| | | | |
|---|---|---|---|
| 5,886,665 A | 3/1999 | Dosh | |
| 5,886,666 A * | 3/1999 | Schellenberg et al. | 701/3 |
| 6,336,076 B1 | 1/2002 | Farley | |
| 6,590,524 B1 * | 7/2003 | Farley et al. | 342/357.06 |

OTHER PUBLICATIONS

Ozimek, Igor et al, "Navigation-Related Services over Stratospheric Platforms," Electrotechnical Review, Ljubljana, Slovenija, Feb. 2004.*
Wang, J. "Pseudolite Applications in Positioning and Navigation: Progress and Problems," Journal of Global Positioning Systems, vol. 1, No. 1:48-56, Jul. 2002.*

Avagnina, Davide et al, "Wirless Networks Based on High-Altitude Platforms for the Provision of Integrated Navigation/Communication Services," IEEE Communications Magazine, Feb. 2002, pp. 119-125.*
GPS Pseudolite Transceivers and Their Applications, Jonathan M. Stone, et al., Ion National Technical Meeting 99, San Diego, California, Jan. 25-27, 1999.

* cited by examiner

Primary Examiner—Gregory C. Issing
(74) Attorney, Agent, or Firm—Nathan O. Jensen; Kyle Eppele

(57) ABSTRACT

The pseudolite includes a communication (COM) satellite receiver for receiving a communication satellite specific RF signal from a communication satellite and providing communication satellite navigation and position data. A GNSS receiver receives a GNSS signal from a GNSS satellite and provides GNSS timing information. A pseudolite transmitter receives the communication satellite navigation and position data and the GNSS timing information. The pseudolite transmitter includes at least one digital signal generator for utilizing the communication satellite navigation and position data and the GNSS timing information for providing a digital signal generator output having an intermediate frequency and navigation message data which are suitable for up-conversion to a desired communication channel RF frequency. At least one communication satellite RF module of the pseudolite transmitter receives the digital signal generator intermediate frequency output from an associated signal generator and converts the intermediate frequency output to a communication satellite transmit RF signal having the desired communication channel RF frequency. The communication channel RF frequency is preferably adjustable and may cover a range of potential communication frequencies.

20 Claims, 2 Drawing Sheets

PSEUDOLITE NAVIGATION SYSTEM

BACKGROUND OF THE INVENTION

1. Field of the Invention

The present invention relates to satellite navigation and positioning systems. More particularly, the present invention relates to a pseudo-satellite (pseudolite) navigation system which enhances operation of a global navigational satellite system (GNSS) when satellite ephemeris data is unavailable due to jamming or otherwise too weak.

2. Description of the Related Art

Global navigational satellite systems (GNSS) are known and include the global positioning system (GPS) and the Russian global orbiting navigational satellite system (GLONASS). GNSS-based navigational systems are used for navigation and positioning applications. In this regard, the present invention will be discussed with respect to the global positioning system (GPS). However, it will be apparent to those skilled in the art that the present invention can be applied to any global navigational satellite system (GNSS), including the Russian global orbiting navigational satellite system (GLONASS). The present invention is not intended to be limited to GPS applications.

The use of GPS signals to calculate position and GPS time is known in the art. There are times when it is difficult or impossible to receive the true GPS signals from the satellites. For example, there are times when the GPS signals are jammed in a localized area, or a GPS receiver may be located in a position, e.g. a valley, where it cannot receive signals from a sufficient number of satellites.

In order to make GPS signals available to receivers in locations where the true signal is being jammed, the concept of pseudolites was invented. A pseudolite includes a pseudolite transmitter that sends out pseudolite signals which are designed to simulate the true GPS signals from the satellites. An example of a ground-based pseudolite is disclosed in U.S. Pat. No. 5,886,665. An example of an airborne pseudolite is disclosed in U.S. Pat. No. 5,886,666.

U.S. Pat. No. 6,590,524 discloses a method of controlling a slave time by adjusting the slave time based on a master time. In one embodiment, a global positioning system (GPS) receiver calculates GPS time and sends a correction signal to a pseudolite, in order to slave the pseudolite time to GPS time.

The disclosures of U.S. Pat. Nos. 5,886,665, 5,886,666, and 5,590,524 are hereby incorporated by reference in their entireties.

A major limitation of the current art in pseudolite navigation systems is their limitation of usefulness to line of sight distances. RF navigation signals are attenuated by terrain and the curvature of the earth. Ground transmitters are limited to 30–40 km operational ranges. Airborne transmitters are limited to 300 Km maximum even at an altitude of 65,000 ft. A second limitation is the ease of adversaries to jam or otherwise interfere with known GNSS frequencies. GNSS signals in space are low power and susceptible to small amounts of interference levels.

As will be disclosed below the present invention provides a pseudolite system that can operate beyond the limitations of terrestrial line of sight. This "covert" pseudolite system also benefits the user by not requiring specific dependence on a fixed RF frequency spectrum. Frequencies are determined by the host communications systems and can be arbitrary changed as needed.

SUMMARY OF THE INVENTION

In a broad aspect, the present invention is a pseudolite for use in a navigation system. The pseudolite includes a communication (COM) satellite receiver for receiving a communication satellite specific RF signal from a communication satellite and providing communication satellite navigation and position data. A GNSS receiver receives a GNSS signal from a GNSS satellite and provides GNSS timing information. A pseudolite transmitter receives the communication satellite navigation and position data and the GNSS timing information. The pseudolite transmitter includes at least one digital signal generator for utilizing the communication satellite navigation and position data and the GNSS timing information for providing a digital signal generator output having an intermediate frequency and navigation message data which are suitable for up-conversion to a desired communication channel RF frequency. At least one communication satellite RF module of the pseudolite transmitter receives the digital signal generator intermediate frequency output from an associated signal generator and converts the intermediate frequency output to a communication satellite transmit RF signal having the desired communication channel RF frequency. The communication channel RF frequency is preferably adjustable and may cover a range of potential communication frequencies.

During operation of the pseudolite the communication satellite transmit RF signal is broadcast to a communication satellite. Then a communication satellite specific RF signal is broadcast from the communication satellite capable of being received by the communication satellite receiver. Thus, a closed loop control feedback is provided to adjust the timing of the broadcasted communication satellite specific RF signal so that it is synchronized with the GNSS signal. The broadcasted communication satellite specific RF signal can be utilized by a user, the pseudolite thereby being capable of operating at relatively high power to overcome GNSS jamming effects with beyond the line-of-sight capability.

The principles of the present invention are particularly useful in application with a joint tactical radio system (JTRS) as will be explained below in detail. The JTRS system is based on a software defined radio that has flexibility to demodulate and broadcast RF signals over a wide range of radio frequencies. JTRS can adapt as needed to communicate and track signals over multiple frequencies and multiple communications protocols Use of the communication channel RF frequencies provides flexibility. Communication satellites operate over a wide frequency range with thousands of possible broadcast channels. The covert pseudolite signals can be hidden within any combination of existing broadcast channels and arbitrarily changed as desired.

In a battlefield application, the present invention obviates the need for distributed transmitters scattered all over the battlefield. A central ground based control facility with line of sight to the desired communications satellites can house all of the required pseudolite transmitters. This approach represents a significant cost savings over the current systems which require expensive transmitter integration on multiple airborne platforms. A technical advantage of this approach is the ability to directly synchronize all the pseudolite hardware, thereby reducing independent platform synchronization errors.

The present invention provides an unpredictable navigation capability that does not require participation from the communication satellite providers other than "renting" use of the communications channel.

BRIEF DESCRIPTION OF THE DRAWINGS

The same elements or parts throughout the figures of the drawings are designated by the same reference characters, while equivalent elements bear a prime designation.

DETAILED DESCRIPTION OF THE INVENTION

Figure 1:
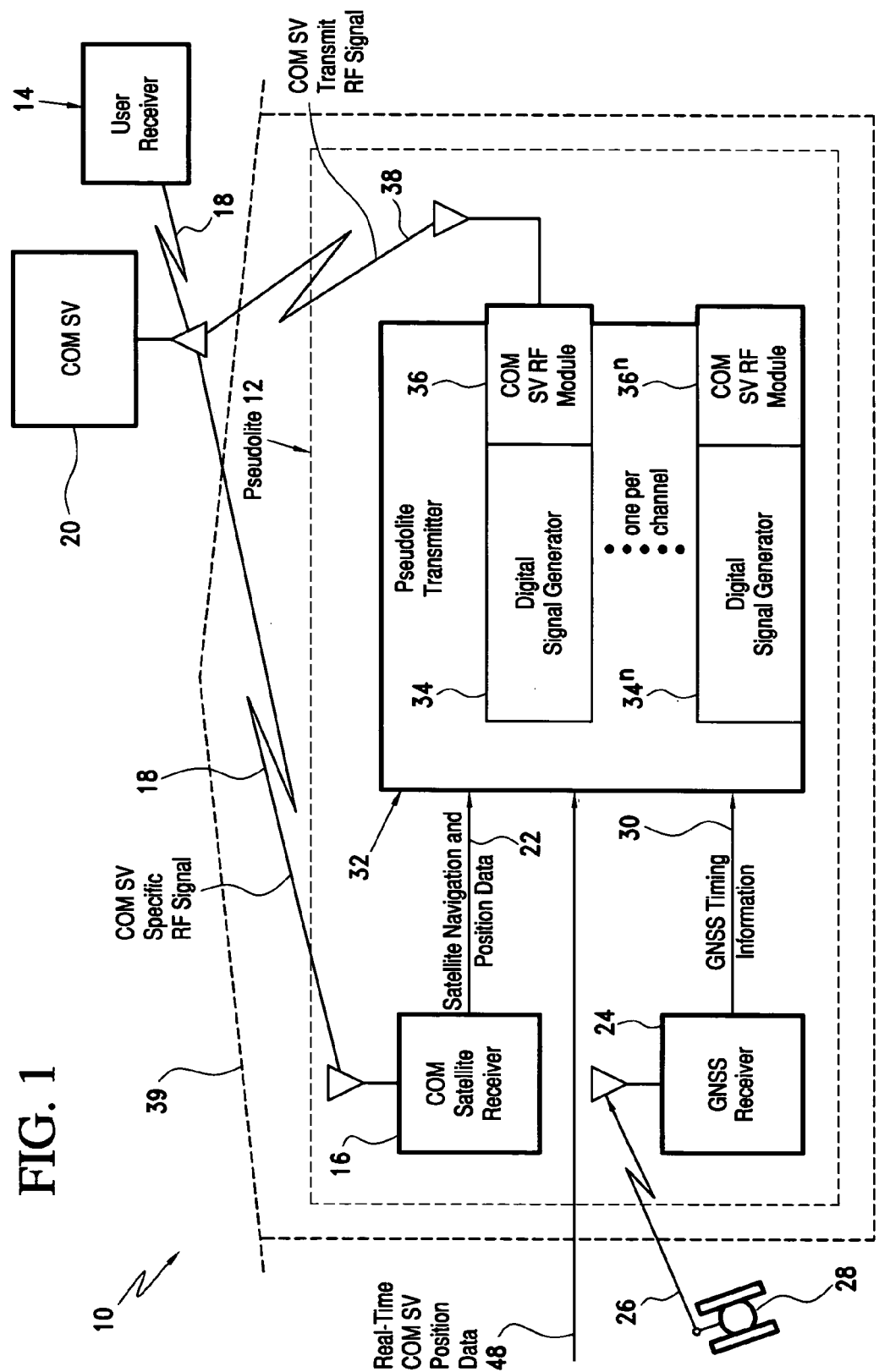
FIG. 1 is a diagrammatic illustration of a pseudolite enhanced GPS in accordance with preferred embodiments of the present invention.

Referring now to the drawings and the characters of reference marked thereon, FIG. 1 illustrates a preferred embodiment of the pseudolite navigation system of the present invention, designated generally as 10. The pseudolite navigation system 10 includes a pseudolite, designated generally as 12; and, a user receiver, designated generally as 14.

The pseudolite 12 includes a communication (COM) satellite receiver 16 for receiving a communication (COM) satellite specific RF signal 18 from a communication (COM) satellite 20 and providing communication (COM) satellite navigation and position data 22. The communication satellite receiver 16 is preferably a joint tactical radio system (JTRS) as discussed in more detail below. Other possible receiver types include any of the current inventory of military tactical radios. Commercial radio sets such as Iridium are possibilities as well. The communication satellite 20 may be any of a number of communication satellites, such as Iridium, MILSTAR, GLobalStar, etc. The primary consideration for selection of the communication network to be used is compatibility with existing user radio equipment frequency ranges.

The COM satellite navigation and position data 22 needed is real time orbital location data. Orbital location can be provided generally in any available data format. Lever arm coordinate transformations are used to translate the communications satellite position to the actual transmitter antenna location.

A GNSS receiver 24 receives a GNSS signal 26 from a GNSS satellite 28 and provides GNSS timing information 30. The GNSS satellite is typically a GPS satellite but may be, for example, a GLONASS satellite.

A pseudolite transmitter, designated generally as 32, includes at least one digital signal generator 34 for utilizing the communication satellite navigation and position data 22 and the GNSS timing information 30 for providing a digital signal generator output having an intermediate frequency and navigation message data which are suitable for up-conversion to a desired communication channel RF frequency. The signal generator may be of a type sold by Rockwell Collins such as the products referred to as PCSG (Personal Computer Signal Generator) and GSS (GNSS Signal Simulator).

The pseudolite transmitter 32 also includes at least one communication satellite RF module 36 for receiving the digital signal generator intermediate frequency output from an associated signal generator 36 and converting the intermediate frequency output to a communication satellite transmit RF signal 38 having the desired communication channel RF frequency. The communication channel RF frequency is preferably adjustable to cover a range of potential communication frequencies. In some instances, if the only legacy hardware is available, it may not be adjustable. If the present invention is implemented with a JTRS receiver 16 the communication satellite RF module 36 converts the output of the digital signal generator 34 to the full bandwidth of the joint tactical radio system (JTRS).

As noted above, the pseudolite 12 of the present invention obviates the need for distributed transmitters at different locations. Dashed line 39 represents that a central control facility 39 may contain all the required equipment (i.e., pseudolite 12 related equipment) to create the navigation signals. The broadcast navigation signals (i.e. signals 18) are used by the user receivers 14, 16 to navigate. The central control facility 39 also receives these signals in order to perform a closed loop time synchronization monitoring and adjustment function. Real time communications satellite orbital position is provided to the control facility from external sources as indicated by line 48 representing real-time communication position data 48.

During operation of the pseudolite, the communication satellite transmit RF signal 38 is broadcast to a communication satellite 20, and then the communication satellite specific RF signal 18 is broadcast from the communication satellite 20 which is capable of being received by the communication satellite receiver 16, thus providing a closed loop control feedback to adjust the timing of the broadcasted communication satellite specific RF signal 18 (i.e. a slave time) so that it is synchronized with the GNSS signal 26 (i.e. a master time). The broadcasted communication satellite specific RF signal 18 is utilizable by the user 14. The pseudolite 32 is thereby capable of operating at relatively high power to overcome GNSS jamming effects with beyond the line-of-sight capability. As used herein, the term "relatively high power" may refer to a broad range, i.e. 1 to 100 watts. It may typically operate at a power level of about 50 watts.

The first step in this synchronization is receiving a signal from a remote source (i.e. GNSS satellite) which the master time can be derived. After the signal is received, the slave time is compared to the master time to detect any offset of the slave time relative to the master time. If there is any offset, the slave time is adjusted to correct the offset. This process is recursively repeated in a closed loop manner as described in detail in U.S. Pat. No. 6,590,524, which as discussed above, is incorporated by reference in its entirety herein. In a preferred implementation the GNSS signal comprises GPS L1 and L2 frequencies as master time sources for the pseudolite navigation system.

The user receiver 14 may be a modified GPS or GLONASS receiver. The digital processing section of current receiver designs may be integrated with a broad band RF front end that covers the communications satellite frequencies. The modified receiver will use the navigation message and PRN codes to determine position, velocity and time. Other possibilities include hosting the navigation software on a software defined radio platform such as JTRS. However, it is likely to be the same type of a system as the communication satellite receiver 16, most likely a joint tactical radio system (JTRS).

Figure 2:
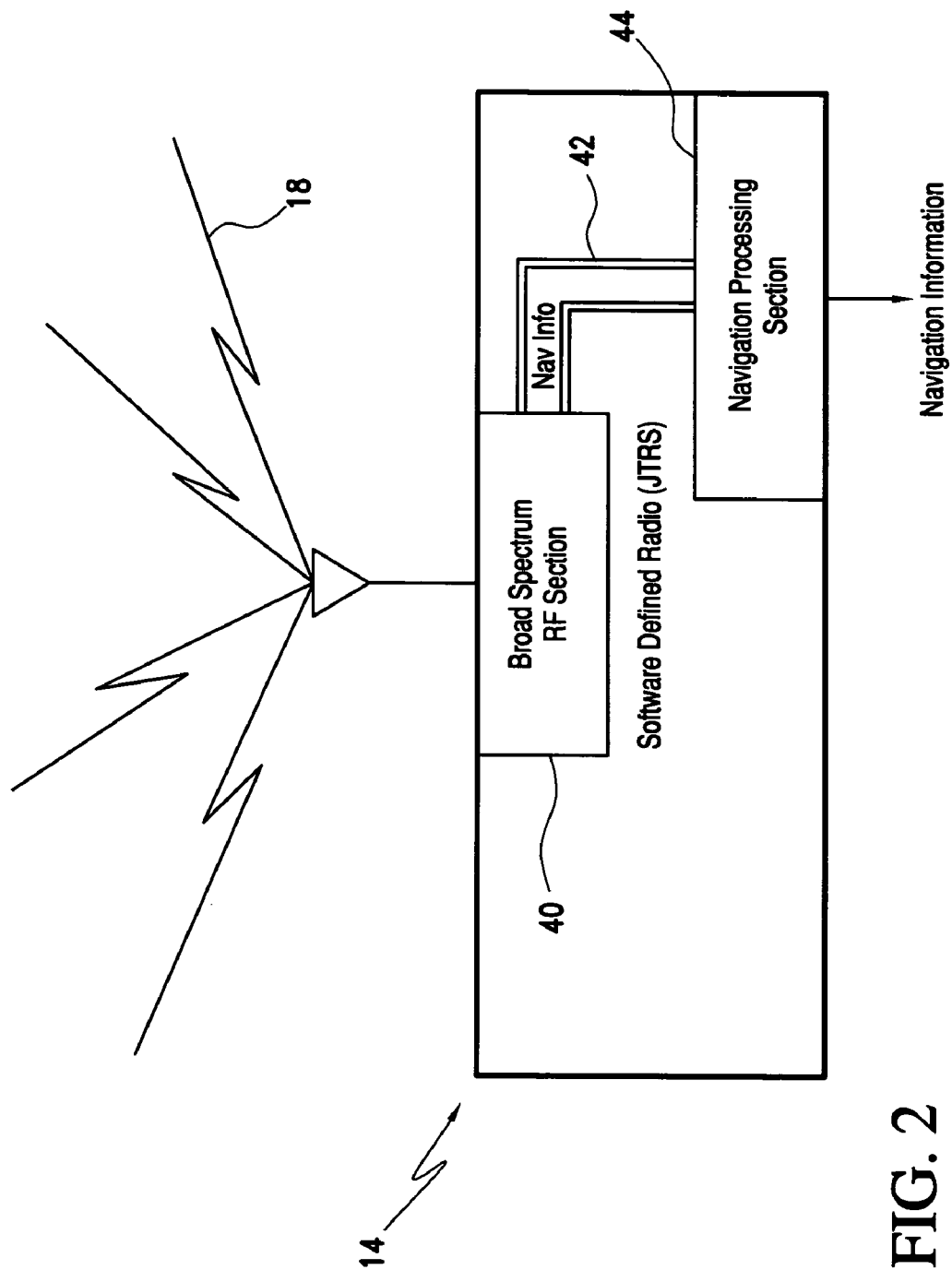
FIG. 2 is a diagrammatic illustration of a user receiver utilized in the navigation system of the present invention.

Referring now to FIG. 2, a preferred embodiment of the user receiver 14 is illustrated. The user receiver 14 is a software defined radio system. It includes a broad spectrum RF section 40 for receiving the communication satellite specific RF signal and demodulating navigation codes and information thus providing navigation information 18. The broad spectrum RF section 40 may be, for example, JTRS hardware. Ideally, the frequency range would be from 300 MHz up to 27 GHz. From a practical standpoint it is likely that various subsets of this frequency range would be used. A navigation processing section 44 receives the navigation information 46 from different communication satellites and processes it for use by the ultimate user. The navigation processing section 44 may include, for example, a GPS Kalman filter.

Other embodiments and configurations may be devised without departing from the spirit of the invention and the scope of the appended claims.

The invention claimed is:

1. A pseudolite for use in a navigation system, the pseudolite comprising:
 a communication (COM) satellite receiver for receiving a communication satellite specific RF signal from a communication satellite and providing communication satellite navigation and position data;
 a GNSS receiver for receiving a GNSS signal from a GNSS satellite and providing GNSS timing information;
 a pseudolite transmitter for receiving said communication satellite navigation and position data and said GNSS timing information, said pseudolite transmitter, comprising:
  i. at least one digital signal generator for utilizing said communication satellite navigation and position data and said GNSS timing information for providing a digital signal generator output having an intermediate frequency and navigation message data which are suitable for up-conversion to a desired communication channel RF frequency; and,
  ii. at least one communication satellite RF module for receiving said digital signal generator intermediate frequency output from an associated signal generator and converting said intermediate frequency output to a communication satellite transmit RF signal having said desired communication channel RF frequency;
 wherein during operation of the pseudolite said communication satellite transmit RF signal is broadcast to a communication satellite, and then a communication satellite specific RF signal is broadcast from said communication satellite capable of being received by said communication satellite receiver, thus providing a closed loop control feedback to adjust the timing of said broadcasted communication satellite specific RF signal so that it is synchronized with said GNSS signal, said broadcasted communication satellite specific RF signal being utilizable by a user, said pseudolite thereby being capable of operating at relatively high power to overcome GNSS jamming effects with beyond the line-of-sight capability.

2. The pseudolite of claim 1, wherein said communication channel RF frequency is adjustable to cover a range of potential communication frequencies.

3. The pseudolite of claim 1, wherein said communication satellite RF module converts said output of said digital signal generator to the full bandwidth of a joint tactical radio system (JTRS).

4. The pseudolite of claim 1, wherein said communication (COM) satellite receiver comprises a joint tactical radio system (JTRS).

5. The pseudolite of claim 1, wherein said user comprises a joint tactical radio system (JTRS).

6. The pseudolite of claim 1, wherein said GNSS receiver comprises a GPS receiver and said GNSS timing information comprises GPS timing information.

7. The pseudolite of claim 1, wherein said GNSS signal comprises GPS L1 and L2 frequencies as master time sources for the pseudolite navigation system.

8. The pseudolite of claim 1, wherein said communication (COM) satellite receiver comprises:
 a software defined radio system, comprising:
  a broad spectrum RF section for receiving said communication satellite
 specific RF signal and demodulating navigation codes and information and thus providing navigation information; and,
  a navigation processing section for receiving said navigation information and processing it for use by the ultimate user.

9. A pseudolite navigation system, comprising:
 a pseudolite, comprising:
  a communication (COM) satellite receiver for receiving a communication satellite specific RF signal from a communication satellite and providing communication satellite navigation and position data;
  a GNSS receiver for receiving a GNSS signal from a GNSS satellite and providing GNSS timing information;
  a pseudolite transmitter for receiving said communication satellite navigation and position data and said GNSS timing information, said pseudolite transmitter, comprising:
   1. at least one digital signal generator for utilizing said communication satellite navigation and position data and said GNSS timing information for providing a digital signal generator output having an intermediate frequency and navigation message data which are suitable for up-conversion to a desired communication channel RF frequency; and,
   2. at least one communication satellite RF module for receiving said digital signal generator intermediate frequency output from an associated signal generator and converting said intermediate frequency output to a communication satellite transmit RF signal having said desired communication channel RF frequency; and,
 a pseudolite user receiver for receiving said communication satellite specific RF signal from said communication satellite,
 wherein during operation of the pseudolite said communication satellite transmit RF signal is broadcast to a communication satellite, and then a communication satellite specific RF signal is broadcast from said communication satellite capable of being received by said communication satellite receiver, thus providing a closed loop control feedback to adjust the timing of said broadcasted communication satellite specific RF signal so that it is synchronized with said GNSS signal, said broadcasted communication satellite specific RF signal being utilized by said pseudolite user receiver, said pseudolite transmitter thereby being capable of operating at relatively high power to overcome GNSS jamming effects with beyond the line-of-sight capability.

10. The pseudolite navigation system of claim 9, wherein said communication channel RF frequency is adjustable to cover a range of potential communication frequencies.

11. The pseudolite navigation system of claim 9, wherein said communication satellite RF module converts said output of said digital signal generator to the full bandwidth of a joint tactical radio system (JTRS).

12. The pseudolite navigation system of claim 9, wherein said communication (COM) satellite receiver comprises a joint tactical radio system (JTRS).

13. The pseudolite navigation system of claim 9, wherein said user comprises a joint tactical radio system (JTRS).

14. The pseudolite navigation system of claim 9, wherein said GNSS receiver comprises a GPS receiver and said GNSS timing information comprises GPS timing information.

15. The pseudolite navigation system of claim 9, wherein said GNSS signal comprises GPS L1 and L2 frequencies as master time sources for the pseudolite navigation system.

16. The pseudolite navigation system of claim 9, wherein said communication (COM) satellite receiver comprises:
  a software defined radio system, comprising:
    a broad spectrum RF section for receiving said communication satellite specific RF signal and demodulating navigation codes and information and thus providing navigation information; and,
    a navigation processing section for receiving said navigation information and processing it for use by the ultimate user.

17. A method of providing satellite data from a first global navigation satellite system (GNSS) satellite to a GNSS receiver, the method comprising the steps of:
  a) receiving a communication satellite specific RF signal broadcast from a communication satellite and providing communication satellite navigation and position data;
  b) receiving a GNSS signal from a GNSS satellite and providing GNSS timing information;
  c) utilizing said communication satellite navigation and position data and said GNSS timing information for providing a digital signal generator output having an intermediate frequency and navigation message data which are suitable for up-conversion to a desired communication channel RF frequency;
  d) receiving said digital signal generator intermediate frequency output from an associated signal generator and converting said intermediate frequency output to a communication satellite transmit RF signal having said desired communication channel RF frequency;
  e) transmitting a communication satellite transmit RF signal to a communication satellite; and,
  f) broadcasting said communication satellite specific RF signal, thus providing a closed loop control feedback to adjust the timing of said broadcasted communication satellite specific RF signal so that it is synchronized with said GNSS signal, said broadcasted communication satellite specific RF signal being utilizable by a user, said steps of providing a digital signal generator output and converting said intermediate frequency output to a communication satellite transmit RF signal being capable of operating at relatively high power to overcome GNSS jamming effects with beyond the line-of-sight capability.

18. The method of claim 17, wherein said communication channel RF frequency is adjustable to cover a range of potential communication frequencies.

19. The method of claim 17, wherein said step of converting said intermediate frequency output to a communication satellite transmit RF signal comprises converting to the full bandwidth of a joint tactical radio system (JTRS).

20. The method of claim 17, wherein said step of receiving a GNSS signal from a GNSS satellite comprises receiving a GPS signal from a GPS satellite.

* * * * *